United States Patent
Sridhar et al.

(10) Patent No.: US 12,259,780 B2
(45) Date of Patent: Mar. 25, 2025

(54) SYSTEMS AND/OR METHODS FOR AUTOMATIC DETECTION AND CORRECTION OF PROBLEMS IN A FLOW SERVICE FOR AN INTEGRATION PLATFORM-AS-A-SERVICE INTEGRATION TO REDUCE DESIGN TIME ISSUES

(71) Applicant: International Business Machines Corporation, Armonk, NY (US)

(72) Inventors: Santhosh Hari Sridhar, Bengaluru (IN); Garima Tater, Berlin (DE)

(73) Assignee: International Business Machines Corporation, Armonk, NY (US)

( * ) Notice: Subject to any disclaimer, the term of this patent is extended or adjusted under 35 U.S.C. 154(b) by 8 days.

(21) Appl. No.: 18/084,875

(22) Filed: Dec. 20, 2022

(65) Prior Publication Data

US 2024/0202065 A1 Jun. 20, 2024

(51) Int. Cl.
G06F 11/07 (2006.01)

(52) U.S. Cl.
CPC ...... *G06F 11/0793* (2013.01); *G06F 11/0736* (2013.01); *G06F 11/079* (2013.01)

(58) Field of Classification Search
CPC . G06F 11/0793; G06F 11/0736; G06F 11/079
See application file for complete search history.

(56) References Cited

U.S. PATENT DOCUMENTS

| | | | |
|---|---|---|---|
| 7,503,037 B2 | 3/2009 | Banerjee et al. | |
| 7,614,043 B2 | 11/2009 | Ognev et al. | |
| 9,672,481 B1 | 6/2017 | Kolawa et al. | |
| 10,642,716 B1 | 5/2020 | Yoshida et al. | |
| 10,680,913 B1 * | 6/2020 | Achi Vasudevan | G06F 21/577 |
| 2014/0289391 A1 * | 9/2014 | Balaji | H04L 67/306 709/224 |
| 2016/0342453 A1 * | 11/2016 | Khan | G06F 11/0793 |

(Continued)

OTHER PUBLICATIONS

WebMethods IO Integration: FlowServices, electronically retrieved Dec. 12, 2022, 102 pages. https://docs.webmethods.io/integration/developer_guide/flowservices/#gsc.tab=0.

*Primary Examiner* — Jigar P Patel
(74) *Attorney, Agent, or Firm* — CANTOR COLBURN LLP; Nicholas Welling

(57) ABSTRACT

Certain example embodiments detect and correct errors in services defining an integration of disparate computing components in an integration platform-as-a-service environment. The services are iterated through to identify reference mappings therein. For each identified reference mapping in each of the services, a determination is made regarding whether a reference corresponding to the respective mapping is valid. For each reference determined to be not valid, an error type associated with the respective reference is identified, and an aspect of the reference is automatically replaced if the respective error type is a reference-related error. A user may be prompted to create an element of the integration if the error type determined for the respective reference is an asset-related error involving a missing integration element. Configuration-related errors also are detectable. A health score for a given service may be calculated based on a number of the configuration-, asset-, and reference-related errors detected.

23 Claims, 11 Drawing Sheets

(56) References Cited

U.S. PATENT DOCUMENTS

| | | | |
|---|---|---|---|
| 2018/0278646 A1* | 9/2018 | Tu | H04L 65/40 |
| 2020/0167263 A1* | 5/2020 | Liu | G06F 11/3616 |
| 2022/0058033 A1* | 2/2022 | Verma | G06F 9/485 |
| 2022/0248296 A1* | 8/2022 | Merwaday | H04W 36/30 |

* cited by examiner

Fig. 5B

| Configuration errors | | | |
|---|---|---|---|
| | Step Number | Category | Error |
| ∨ | 6 | CONNECTIONS | Account not configured |
| Connector: Marketo | | | |
| Operation: createExportActivityJob | | | |
| ∧ | 15 | CONNECTIONS | Account not configured |
| ∧ | 20 | CONNECTIONS | Account not configured |
| ∧ | 35 | CONNECTIONS | Account not configured |

510

Asset Errors

| | Step Number | Category | Error |
|---|---|---|---|
| ∨ | 86 Missing Document: ServiceRequestUpdate Category: SERVICES ǀ PIPELINE OUTPUT FIELD | SERVICES | Document Reference not found |
| ∨ | 86 | SERVICES | Document Reference not found |
| ∨ | 85 | FLOW SERVICE | Document Reference not found |
| ∨ | 82 | SERVICES | Document Reference not found |
| ∨ | 80 | SERVICES | Document Reference not found |
| ∨ | 77 | SERVICES | Document Reference not found |
| ∨ | 74 | SERVICES | Document Reference not found |
| ∨ | 28 | SERVICES | Document Reference not found |

Fig. 7B

SYSTEMS AND/OR METHODS FOR AUTOMATIC DETECTION AND CORRECTION OF PROBLEMS IN A FLOW SERVICE FOR AN INTEGRATION PLATFORM-AS-A-SERVICE INTEGRATION TO REDUCE DESIGN TIME ISSUES

TECHNICAL FIELD

Certain example embodiments described herein relate to improvements in complex technology integrations that involve advanced data transformations and/or custom logic implementations. More particularly, certain example embodiments described herein relate to techniques for automatically detecting and correcting design time issues that can appear in flow services that help manage such integrations.

BACKGROUND AND SUMMARY

Cloud computing environments and software-as-a-service (SaaS) applications have become increasingly popular in recent years. Despite this popularity, organizations sometimes struggle to integrate different cloud applications and/or different components that are needed to make cloud or other applications function. For example, to make cloud or other applications work, it sometimes may be necessary to integrate enterprise service buses (ESBs), data integration systems, API management tools, business-to-business (B2B) gateways, and/or other computer-implemented functionality embodied in hardware and/or software.

Recently, integration platform-as-a-service (iPaaS) technology has helped address some of the complexities associated with complicated integrations. In an iPaaS system, a flow service can help a user create complex integrations that involve advanced data transformations and/or custom logic implementations. In this regard, a flow service can help to encapsulate a sequence of services within a single service and manage the flow of data among them, and create complex, advanced integration scenarios involving multiple application endpoints. iPaaS technology can be used to help integrate disparate technologies used in a wide variety of use cases, e.g., using different APIs and/or connectors, where broadly speaking there is a desire to facilitate communication between two or more different applications, services, microservices, and/or other computer-based components. For instance, iPaaS technology can be used in pharmaceutical operations, where integrated components include different sets of Internet-of-Things (IOT) sensors that track temperature, humidity, and/or other environmental conditions at different points throughout the supply chain as products and/or components thereof are managed by different parties operating different equipment; robotics operations used in automated preparation of products in a factory; logistics operations involved in the receipt of raw materials and distribution of finished products, where it may be necessary to track precise timestamped transactions; sales systems tracking purchases where brick-and-mortar and online operations are involved; inventory management systems across different distribution warehouses; big data integration to track efficacy in administration; cloud-based systems supporting the aforementioned and/or other technology platforms; etc. Further examples using these and/or other example components include, for example, the semiconductor, automotive, and other industries.

To help set up a flow service, a user may be provided with data mapping capabilities, a familiar debugging mechanism, a large collection of built-in services, and other tools. For example, with a flow editor, a user can build a flow service by adding steps and selecting relevant constructs such as, for example, connectors, controls, flow services, and services from within the steps. The editor can be interactive for ease of use.

A flow service typically will be written as a sequence of steps. A flow service step is a basic unit of work that an integration system interprets and runs at runtime. The steps may be thought of as being the building blocks of a flow service and can be represented visually in a graphical user interface or other tool. One typical way to show a step of a flow service is as a rectangular block prefixed with a step number. Steps may be compared to an actual implementation of a service in a programming language, where the program logic or algorithm is written. The steps can be run in an order defined by the user. In this regard, the steps can be thought of as being bundles of executable logic, calls to bundles of executable logic, and/or the like.

Each step in a flow service can have one or more references. These references may be within a common namespace (e.g., the same folder), or they could be from one or more different namespaces (e.g., different folders). Possible references in a flow service include: (1) document references, including in an input or output signature or in pipeline mappings/map sets; (2) other flow services; (3) custom operations; (4) connector references, e.g., to REST, SOAP, and/or other interfaces; and (5) custom connector references. In general, these references fall into one of two categories, namely, direct references and transitive references.

If the reference of an asset is directly in the flow service under consideration, it can be considered a direct reference. For instance, in FlowService X refers to FlowService Y, then this reference is a direct reference.

If the flow service has a child flow service and the child flow service references at least one asset, then that asset can be thought of as being a transitive reference for the parent flow service. For instance, if FlowService A refers to FlowService B and FlowService B refers to a document reference doc1, then in this example FlowService A transitively refers to document reference doc1.

Design time issues can arise with either or both of direct and transitive references. For instance, design time issues may occur during importation, publishing, and/or deployment of the respective flow services. Importation of a flow service may occur when an organization migrates to a new computing environment, when an organization tries to duplicate a flow service for a new computing environment, when an organization adopts another organization's flow services, etc. Publishing and deployment may occur when the flow service is being made available in the context of an integration. In that regard, a there typically are three environments, namely, development, staging/quality assurance (QA), and production environments. An integration specialist develops flow services in the development environment. Once the development process is completed, the flow services are promoted to the staging/QA environment, where a quality assurance specialist tests the flow services and validates them across multiple scenarios. Once certified or otherwise approved by the QA specialist, the flow services are promoted to the production environment, where they are rolled out for production and actual consumption.

Unfortunately, integration specialists who develop flow services oftentimes lack objective information that is needed to know whether a flow service is "healthy" and/or whether the references in the flow service are proper. Indeed, a flow service can have hundreds of asset references, either directly or transitively. It can be difficult to identify whether references have any errors, especially with so many assets oftentimes being referred to. A specialist might not be versed on every facet of an organization's technology, especially where there is a complex integration that might seek to leverage outside technology.

As flow services tend to increase in size and complexity every day (e.g., based on new requirements, new builds, new technologies, etc.), it basically is unrealistic to expect any one person to be technically proficient in the details of each flow service—let alone each flow service reference. Furthermore, to the extent that individuals have this technical proficiency, if every flow service in the development cycle needs to be reviewed by one or more of these people, they can inadvertently become bottlenecks in assuring the functional correctness of the application.

Existing tools unfortunately do not help address the above and/or other iPaaS-related concerns. For example, existing approaches typically provide a way to detect issues in generic software. A technology-mediated approach specific to the iPaaS domain and related even more particularly to flow services unfortunately is missing.

Furthermore, existing approaches in general fail to provide an approach to solving design time issues specific to iPaaS-related technology, including flow services. For example, although there are techniques for automatic detection of software bugs and rectification, very few existing techniques use an auto-correction mechanism. Thus, there is a technology gap where such tools are missing in the middleware/iPaaS domain, and it is difficult if not impossible to leverage existing tools for iPaaS-related technology, including flow services.

In view of the foregoing, it will be appreciated that it would be desirable to provide a tool that assists with complex technology integrations that involve advanced data transformations and/or custom logic implementations, e.g., to help automatically detect and correct design time issues that can appear in flow services that help manage such integrations.

One aspect of certain example embodiments relates to an approach that quickly and efficiently identifies potential errors in a flow service, e.g., to help an integration specialist quickly rectify errors in the system. In certain example embodiments, the tool provides assistance beyond merely listing the errors detected in flow services, e.g., by helping the integration specialist to address such errors in an automated way.

Certain example embodiments improve upon existing tools by providing a technology-mediated approach specific to iPaaS technology and flow services, where it is possible to not only detect reference-related issues at the nth level in a hierarchy of flow services and/or assets, but also to provide a way to resolve those issues in an automated way, thereby potentially saving many hours of manual effort that otherwise is likely to be required to fix such issues and reducing the need for a human to have an encyclopedic knowledge of such flow services (which in any event is not even feasible in many or most instances).

Another aspect of certain example embodiments relates to providing an auto- or self-healing system to help restore the software entity's flow service to a healthy state.

Currently, it is not always evident whether a system may handle references and, in some situations, even if it can, there may be restrictions on transitive references, the number of levels that can be supported, etc. One aspect of certain example embodiments relates to an approach for examining and correcting systems with n levels of transitive references while avoiding conventional restrictions on transitive references.

In certain example embodiments, a method of detecting and correcting errors in services defining an integration of disparate computing components in an integration platform-as-a-service environment is provided. Reference mappings are identified in the services by iterating through them. For each identified reference mapping in each of the services, a determination is made as to whether a reference corresponding to the respective identified reference mapping is valid. For each reference determined to be not valid: an error type associated with the respective reference is determined; and an aspect of the reference is automatically and programmatically replaced, provided that the error type determined for the respective reference is of a first type.

In certain example embodiments, there is provided a non-transitory computer readable storage medium storing instructions that, when performed by a processor of a system, detect and correct errors in services defining an integration of disparate computing components in an integration platform-as-a-service environment by performing operations comprising: iterating through the services to identify reference mappings therein; for each identified reference mapping in each of the services, determining whether a reference corresponding to the respective identified reference mapping is valid; and for each reference determined to be not valid: determining an error type associated with the respective reference; and automatically and programmatically replacing an aspect of the reference, provided that the error type determined for the respective reference is of a first type.

In certain example embodiments, a system for detecting and correcting errors in services defining an integration of disparate computing components in an integration platform-as-a-service environment is provided. An interface is configured to enable access to a representation of the services defining the integration. Processing resources include at least one processor and a memory coupled thereto. The processing resources are configured to perform operations comprising: accessing the representation of the services via the interface; iterating through the services to identify reference mappings therein; for each identified reference mapping in each of the services, determining whether a reference corresponding to the respective identified reference mapping is valid; and for each reference determined to be not valid: determining an error type associated with the respective reference; and automatically and programmatically replacing an aspect of the reference, provided that the error type determined for the respective reference is of a first type.

According to certain example embodiments, a user may be prompted to create an element of the integration, provided that the error type determined for the respective reference is of a second type. In some instances, the first type may correspond to a reference error and the second type may correspond to a missing element of the integration.

According to certain example embodiments, the aspect of the reference that is to be automatically and programmatically replaced may be a project and/or tenant related reference. In some cases, it may be replaced based on pattern matching the aspect of the respective reference with corresponding aspects in other services in the integration.

According to certain example embodiments, the determination as to whether a reference is valid may be performed by pattern matching an aspect of the respective reference with a representation of a fully qualified name in a namespace following a naming convention.

According to certain example embodiments, pattern matching may be performed using a regular expression.

According to certain example embodiments, the services may be represented as nodes in a structured file format, and the nodes may be retrieved from the structured file format for the iterating.

According to certain example embodiments, a user may be prompted to create an element of the integration, provided that the error type determined for the respective reference is of a second type different from the first type, e.g., with the first type corresponding to a reference-related error and with the second type corresponding to a missing element of the integration and being an asset-related error; and configuration-related errors may be detected in addition to asset-related errors and reference-related errors.

According to certain example embodiments, a health score may be calculated and generated for display for a given service based on a number of configuration-, asset-, and reference-related errors detected.

According to certain example embodiments, the services may be arranged hierarchically, and the health score may be for the given service and any descendant services thereof.

According to certain example embodiments, static code analysis may be performed on one of more of the services, e.g., with the heath score being further based on the static code analysis.

According to certain example embodiments, the services may be arranged hierarchically, and a representation of the service hierarchy in which different kinds of detected errors are highlighted in different ways may be generated for display.

Certain example embodiments relate to an integration server comprising the systems disclosed herein. According to certain example embodiments, the integration server may further comprise a tool for building the integration and the services used therein.

The features, aspects, advantages, and example embodiments described herein may be used separately and/or applied in various combinations to achieve yet further embodiments of this invention.

BRIEF DESCRIPTION OF THE DRAWINGS

These and other features and advantages may be better and more completely understood by reference to the following detailed description of exemplary illustrative embodiments in conjunction with the drawings, of which:

FIG. 5B is a screen showing more detailed information about configuration errors, accessible from the FIG. 5A example screen, in accordance with certain example embodiments;

FIG. 7B is a screen showing more detailed information about asset errors, accessible from the FIG. 7A example screen, in accordance with certain example embodiments;

DETAILED DESCRIPTION

Figures 1, 2:
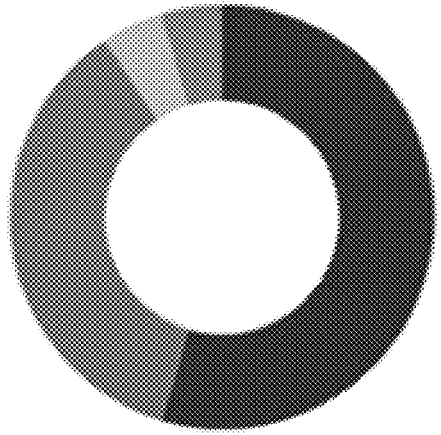
FIG. 1 is an example screen showing details of an illustrative flow service, in accordance with certain example embodiments.
FIG. 2 is an example screen illustrating how flow service composition can be shown, in accordance with certain example embodiments.

Certain example embodiments relate to tools usable with complex technology integrations that involve advanced data transformations and/or custom logic implementations, e.g., to help automatically detect and correct design time issues that can appear in flow services that help manage such integrations. Certain example embodiments leverage a Flow Health Checker tool to identify inconsistent and/or improper references within a flow service or a group of flow services. The Flow Health Checker of certain example embodiments helps a user diagnose potential problems in a flow service, while also considering the flow service(s) it references. In certain example embodiments, the Flow Health Checker is configured to detect inconsistencies and/or other errors in the references and to indicate the cumulative health status of the service, e.g., in the form of an intuitive dashboard.

The Flow Health Checker dashboard of certain example embodiments includes a number of components displayed in different respective display sections. In certain example embodiments, the components are displayable on a common screen. In certain example embodiments, the components are displayed on multiple different display screens. In some instances, the components may be rearrangeable on the display. The components may include, for example, overview information, flow composition information, flow health status, a flow hierarchy, configuration error information, reference error information, an option to implement auto-correction functionality, a detailed error report, and/or the like.

In certain example embodiments, an existing flow service is iterated on until there no further child flow service to process in developing a flow hierarchy. The iteration may include a depth-first search, breadth-first search, and/or other traversal of the elements in a flow service's hierarchy. A health check score is computed for each flow service referred to in the flow hierarchy in certain example embodiments. According to certain example embodiments, the health of the "top-level flow service" in the hierarchy is the cumulative health score calculated across the flow services referred to in the respective hierarchy. In certain example embodiments, the health score for each child flow service is the cumulative health score calculated across the flow services referred to in the respective child's flow hierarchy. In different example embodiments, the health score for a given child flow service is calculated for just that given child flow service. In certain example embodiments, the tool may enable a user to calculate a health score for one or more different flow services (e.g., based on a user selection of one or more flow services to be scored and a corresponding computation regarding the same). Certain example embodiments may describe the hierarchy of the flow services in an intuitive user interface. When the user navigates to the respective flow service, the health score and the composition of the corresponding flow service may be shown via the user interface.

Predefined checks are executed to analyze and determine whether the flow service is healthy. In certain example embodiments, several health check procedures are available for use and/or configuration. Health checker procedures include, for example, a configuration checker, references checker, and asset checker. These checkers may be implemented as computer code executable by a processor on a system that has access to a representation of the integration or at least a representation of the flow services.

The configuration checker of certain example embodiments validates the flow service for any configuration errors. For example, if an account for a connector is not configured, it will be listed in a configuration errors section with details of the step number in which the error is present, along with information about the connector and the operation configured in the connector. The configuration checker of certain example embodiments additionally or alternatively validates the presence of the account node in the namespace to validate this error. This may be performed via a lookup procedure in the integration environment's namespace. For instance, certain example embodiments may check whether a node (representing an asset) matching the fully qualified name of the account node is physically present and activated within the integration environment.

In certain example embodiments, the user is provided with an option to rectify the configuration error. The option may be dependent on the configuration error. For example, for a connector-related error, a user can choose one of the available accounts for the connector from a dropdown, create a new account with an account configuration user interface, and/or the like. The options to help fix a configuration-related error are contextual. For example, for configuration-related issues concerning accounts for connectors, the user may be provided with user interface options for seamless account creation. As an example, in a case where a flow service has connector used in hundreds of steps that has a certain configuration-related error, this approach can solve that issue in just a few clicks by streamlining the correction. In the case of a missing asset (e.g., a missing document type, custom operation, FlowService, or the like), the user interface can helps a user replacing the missing asset with a new asset (e.g., by defining a new replacement asset, presenting candidate replacement assets, etc.).

The reference checker of certain example embodiments validates the direct and transitive references of the assets in the steps of the integration. Flow services used in an enterprise integration platform in brief help a user to develop a complex integration to enable seamless integration and communication between multiple components, which in some instances is accomplished internally using mappings, map set, and map delete functionality. For instance, a mapping can be used to map a field in a particular service (e.g., from application A) to another field in another service (e.g., in application B). Map Set functionality can be used to provide static values to different fields. In a conventional programming language, many temporary variables may be used (e.g., during algorithm computation or other operations). After a particular block of code, the variables used therein may no longer be required, and they may be discarded rather than simply remaining and occupying memory. MapDelete can assist in this regard. As an example, a mapping can help communicate a request received in a Salesforce application to an organization's mail system implemented using Outlook or Gmail, e.g., by mapping the query Text from the Salesforce service to the body of the sendEmail service in a Gmail or Outlook service. A MapSet can help add a prefix to the email message's body to say, for example, "Hello <username>." For example, the reference checker can validate whether a child flow service reference is valid in a given flow service, whether the pipeline mappings/map set/map delete has valid references to documents, fields, etc. The reference checker in turn may have multiple sub-checkers. For example, patterns of a valid project identifier and patterns of a valid tenant identifier may be used to identify patterns in a flow service's asset references to identify and/or correct errors in flow service that is being developed or tested, e.g., as discussed in greater detail below.

Identified errors are listed and information about them may be stored locally. Certain example embodiments provide an option to auto-correct reference errors and, similar to the above, the correction option may depend on characteristics of the reference error. For example, when an auto-correct option is chosen by the integration specialist for a reference error, the algorithm may iterate on the flow hierarchy and apply a pattern matching algorithm to replace corrupted or invalid references with a reference identifier that likely is correct because it matches others found in the hierarchy. Further details of illustrative pattern-matching procedures are provided below, e.g., as described in greater detail below in connection with FIG. 9.

The asset checker of certain example embodiments checks whether particular assets are available in the namespace and establishes a health score. More particularly, the asset checker of certain example embodiments may scan the complete hierarchy (starting with the "root" flow service or another different given flow service) to ensure that the assets referred to either directly or indirectly are physically available in the namespace. The particular assets to be checked may include, for example, flow services, document types, custom operations, custom connectors, on-premise connectors, REST connectors, SOAP connectors, etc. The items checked may or may not be predefined in the system and/or may be user-created or user-modified based on predefined templates or the like. In certain example embodiments, the types of assets and/or namespace can be set by the user.

The asset references that are not present in the namespace may be shown in an asset errors section. Certain example embodiments may provide the user with an option to create the missing assets with the same name as referred to by the flow service, e.g., from the asset errors section itself. Details of the step in which the asset is referred to may be shown as at least part of the error information.

There may be options to export details of the errors in any computer-readable format such as, for example, PDF, XML, JSON, and/or the like. A flat text or other file may be used in addition to, or apart from, a structured file output type.

FIG. 1 is an example screen showing details of an illustrative flow service, in accordance with certain example embodiments. The example flow details/overview screen 100 includes basic information about the flow service such as, for example, the name of the flow service (FlowF in FIG. 1), the project the flow service is associated with (NABAJIT in FIG. 1), information about the creator and last modifier of the flow service, the date and time when the flow service was created and last modified, version details of the flow service, and/or the like.

FIG. 2 is an example screen illustrating how flow service composition can be shown, in accordance with certain example embodiments. The example flow service composition screen 200 includes basic information and/or statistics about the flow service. The FIG. 2 example includes, for instance, a listing of the types of components included in and/or referenced by a given flow service, and a basic count of each. The components in this example include controls, services, applications, and other flow services, although some or all of these and/or other components may be shown in other instances, e.g., depending on the flow service(s) involved in the assessment. In certain example embodiments, the flow service composition screen 200 may include information for just one flow service, or it may be aggregated for all sub-flows of a given flow service. In certain example embodiments, a user may use a switch to toggle between information and/or statistics for the individual flow service, and for the flow service and its sub-flows.

Figure 3:
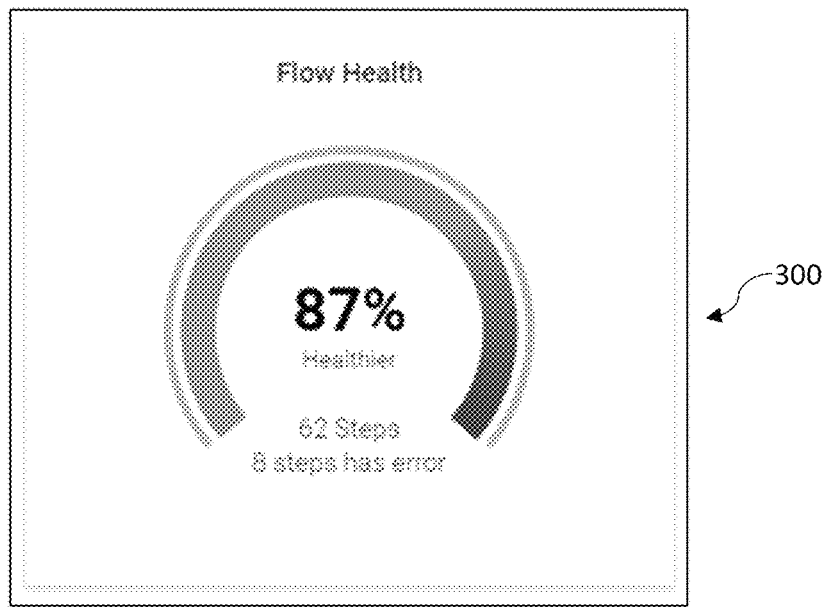
FIG. 3 is a screen showing how the health of a flow service can be graphically depicted, in accordance with certain example embodiments.

FIG. 3 is a screen showing how the health of a flow service can be graphically depicted, in accordance with certain example embodiments. The flow health status screen 300 in the FIG. 3 example provides a visual indication as well as a percentage. The percentage is the simple ratio of the number of healthy steps to the number of total steps. In the FIG. 3 example, there are 62 total steps, and eight have errors, meaning that 54 of the 62 steps are healthy. This means that 87% of the steps in this flow service are healthy in this example, as shown in FIG. 3. Different thresholds may be set to provide different categorical indications of health such as, for example, critical, very unhealthy, unhealthy, healthy, healthier, very healthy, perfect, etc. As mentioned above, the health status may be provided as a cumulative measure for a flow service and all of its sub-flows. In certain example embodiments, health status may be provided for just one flow. In certain example embodiments, a switch may be provided to toggle back and forth between such views.

Figure 4:
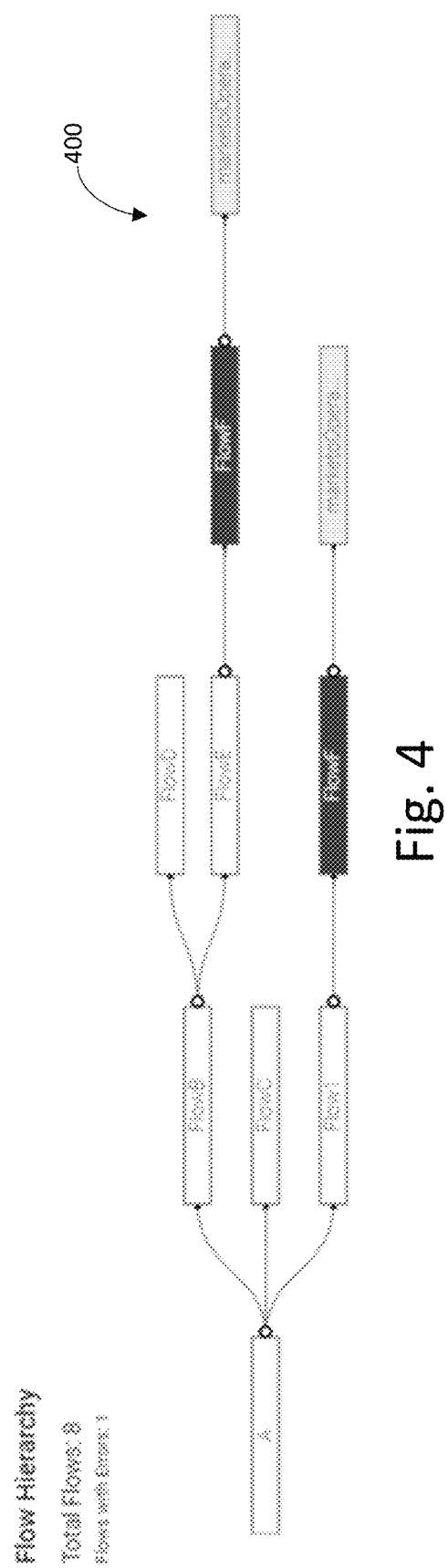
FIG. 4 is a screen showing a flow hierarchy, in accordance with certain example embodiments.

FIG. 4 is a screen showing a flow hierarchy, in accordance with certain example embodiments. In the FIG. 4 example flow hierarchy 400, flow service A and all of its children flows are shown. There are eight total flows, including Flows A-F and Flow 1. The cardinality (e.g., one-to-one, one-to-many, many-to-many) is indicated with the usual symbols. Different colors represent different statuses of the different components in the flow service A hierarchy. A first color (e.g., white) indicates that there are no problems found with that particular component. A second color (e.g., red) indicates an unhealthy flow service (e.g., as is the case with Flow F). A third color (e.g., grey) can indicate a missing asset. These and/or other color-coding and/or labelling systems can be used to show different statuses of different components in the flow hierarchy in different example embodiments.

When a flow service has direct or transitive references to other flow services, this hierarchy visualization helps show how the flows services are referred to, e.g., in a sequence and hierarchically. Summary information about the flow service shown in the flow hierarchy can be provided. This summary information can include, for example, the number of assets, child flow services, flow services with errors, etc. When clicked on or otherwise selected, health status and/or other information of a respective flow service can be displayed.

Figure 5A:
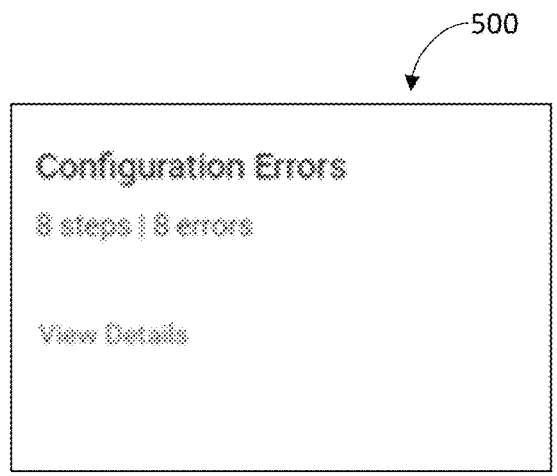
FIG. 5A is a screen showing a summary of configuration error information, in accordance with certain example embodiments.

FIG. 5A is a screen showing a summary of configuration error information, in accordance with certain example embodiments. If a flow service has any configuration errors (e.g., errors with respect to the accounts configured in the connector steps), then related summary information will be displayed. The FIG. 5A example screen 500 indicates that there are eight errors distributed across eight steps. Further details are viewable by clicking or otherwise selecting the detailed view from the FIG. 5A example screen 500.

FIG. 5B is a screen showing more detailed information about configuration errors, accessible from the FIG. 5A example screen 500, in accordance with certain example embodiments. The FIG. 5B screen provides a user interface where configuration errors are shown in a table, making easily understandable aspects of such configuration errors. For instance, from the FIG. 5B example screen 510, it is easy to select an entry to see what component(s) (e.g., connector, flow service, or the like) is/are involved. Also displayed are an error description, indication of step involved, and the operation involved. By selecting an entry, a user can modify the asset to address the issue or see the issue in context, for example.

Figure 6A:
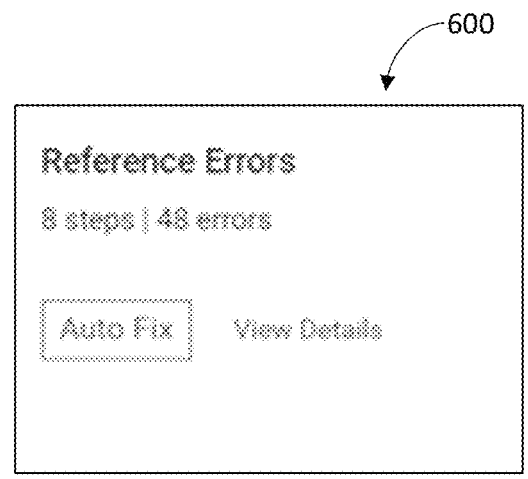
FIG. 6A is a screen showing a summary of reference error information, in accordance with certain example embodiments.

FIG. 6A is a screen showing a summary of reference error information, in accordance with certain example embodiments. If a flow service has any reference errors (e.g., reference-related inconsistencies in a flow service), then related summary information will be displayed. The FIG. 6A example screen 600 indicates that there are 48 errors distributed across eight steps. Further details are viewable by clicking or otherwise selecting the detailed view from the FIG. 6A example screen 600, and an "auto-fix" option also is present for the user, which can trigger the system to at least attempt to automatically correct all of the errors detected.

Figure 6B:
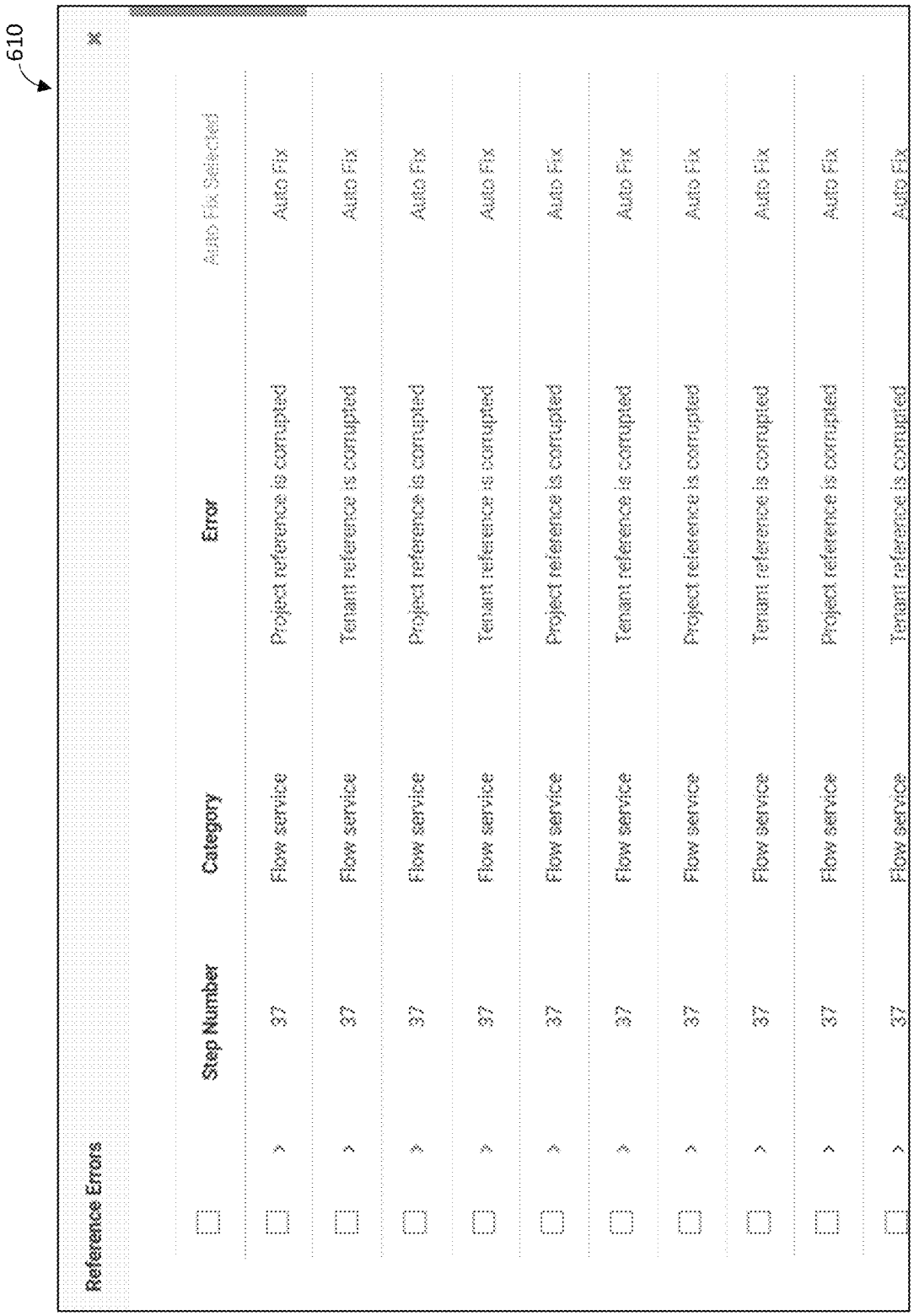
FIG. 6B is a screen showing more detailed information about reference errors, accessible from the FIG. 6A example screen, in accordance with certain example embodiments.

FIG. 6B is a screen showing more detailed information about reference errors, accessible from the FIG. 6A example screen 600, in accordance with certain example embodiments. The FIG. 6B screen provides a user interface where reference errors are shown in a table, making easily understandable aspects of such reference errors. For instance, from the FIG. 6B example screen 610, it is easy to select an entry to see what flow service(s) is/are involved, along with the step number that is implicated. An error description is displayed. Using the FIG. 6B example screen 610, the user can select one or more errors for a system mediated auto-correction attempt. This may in some instances involve searching for replacement or other appropriate functionality, e.g., as described in greater detail below in connection with FIG. 10.

Figure 7A:
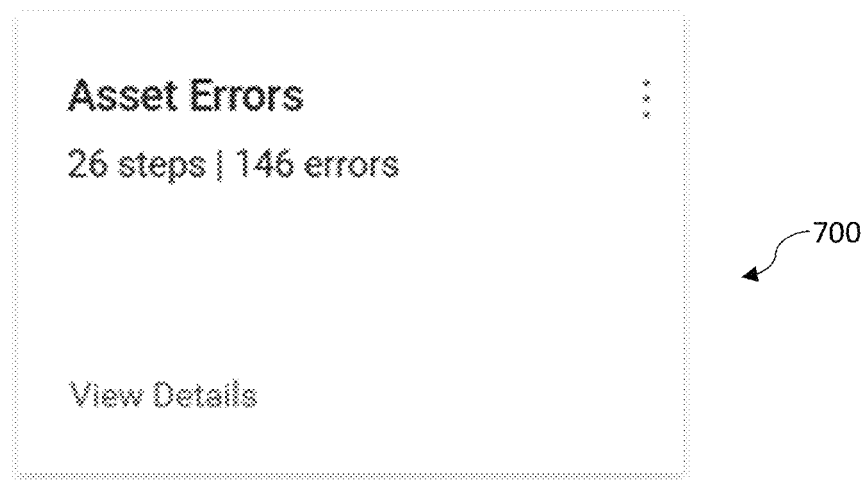
FIG. 7A is a screen showing a summary of asset error information, in accordance with certain example embodiments.

FIG. 7A is similar to FIGS. 5A and 6A, and FIG. 7B is similar to FIGS. 5B and 6B. That is, FIG. 7A is a screen showing a summary of asset error information, in accordance with certain example embodiments, and FIG. 7B is a screen showing more detailed information about asset errors, accessible from the FIG. 7A example screen 700, in accordance with certain example embodiments. The FIG. 7A example screen 700 shows 146 errors distributed over 26 steps, and the FIG. 7B detailed screen 710 can be accessed from the FIG. 7A example screen 700. If any of the flow services, Document Types, Custom Operations, etc., referenced inside a flow service are not found, then an entry is provided in the FIG. 7B screen 710. Aspects of the asset errors are displayable, and the error can be selected by the user so that it can be seen in context and/or addressed.

As indicated above, reference-related errors may be automatically fixed, e.g., upon a user indication that such action should be taken. Also as indicated above, when there are multiple reference errors, they can be automatically fixed individually (e.g., one at a time), or an attempt can be made to address all of the reference errors in the flow service(s) at the same time. In certain example embodiments, if a flow service refers to another flow service hierarchically and if there is an error in the child flow service, triggering an automatic fix on the parent flow service may attempt to fix all of the reference errors in the child flow service(s). In other words, a user triggering an automatic correction of reference errors in a parent may cause an automatic fix in all children in certain example embodiments.

The user can launch the Flow Health Checker from a flow editor in certain example embodiments. For instance, with webMethods.io Integration Server (commercially available from the assignee), the Flow Health Checker may be activated directly from the integration environment's Flow Editor. In terms of a detailed error report, the Flow Health Checker in certain example embodiments displays metadata and/or other information about the flows, the health status, statistical infographics related to the flow services, and the flow hierarchy as well. Users can check the details of the errors (if any) in the flow services, and an auto-correct option may be presented as well. When there is an error in a hierarchical flow with an incorrect reference (e.g., where for instance there is a flow from Flow A→Flow B→Flow C, and some reference is not correct in Flow C), then the error is indicated visually in the Flow Health Checker's hierarchy chart, e.g., as discussed above in connection with FIG. 4.

Figure 8:
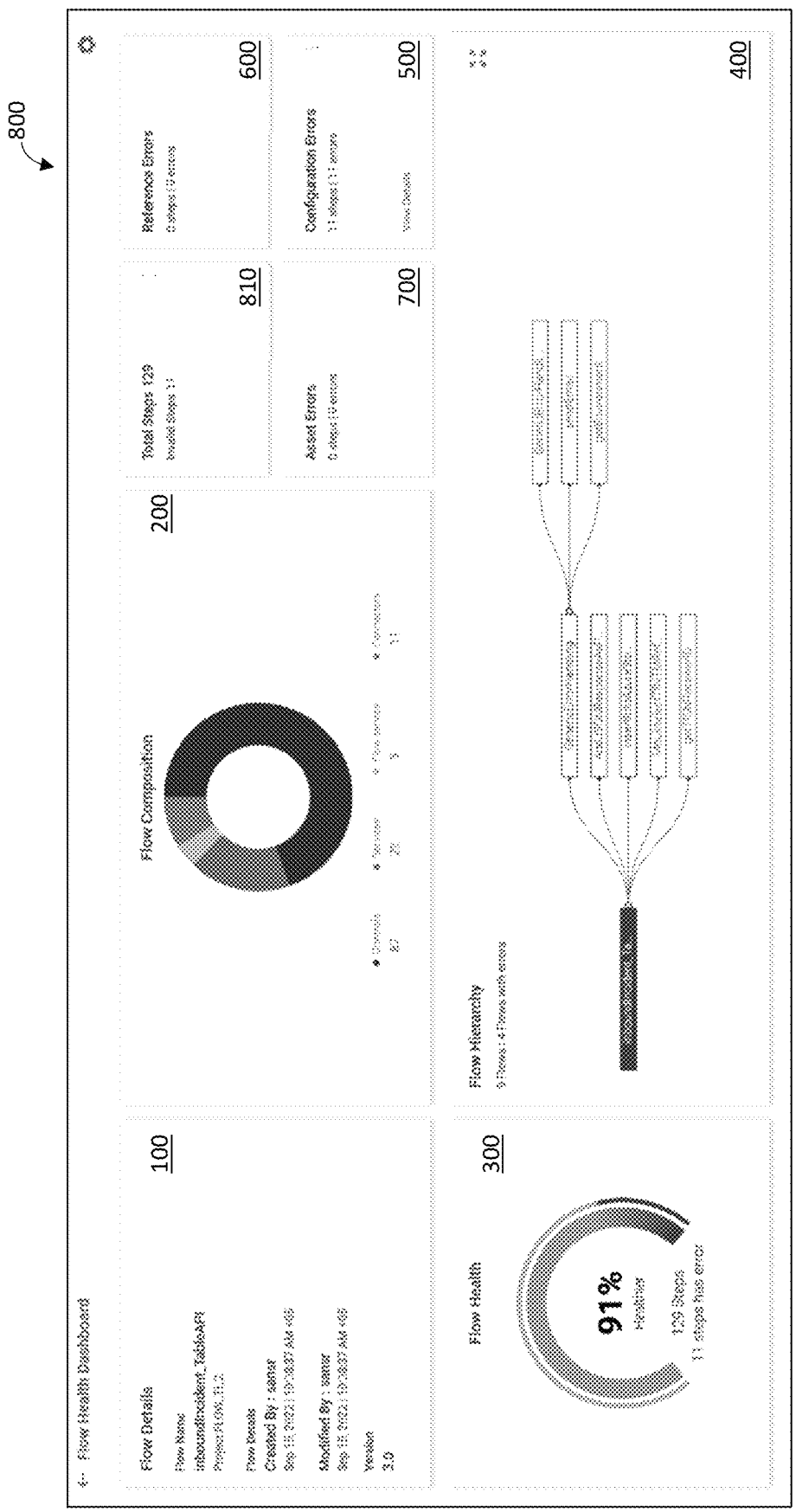
FIG. 8 is an example screen showing health status related information concerning an example flow service, in accordance with certain example embodiments.

Based on the above, it will be appreciated that the Flow Health Checker of certain example embodiments helps a user assess a flow service along with the flow services it references. The Flow Health Checker of certain example embodiments is operable with direct references and transitive references, and is configured to detect inconsistencies in such references and indicate the cumulative health status in the form of an intuitive dashboard or other visualization. An example dashboard is shown in FIG. 8. In other words, FIG. 8 is an example screen 800 showing health status related information concerning an example flow service, in accordance with certain example embodiments. The FIG. 8 example dashboard 800 includes sections for the screens discussed above so that the user can assess the health of the involved flow service at a glance and optionally trigger auto-correct actions. The FIG. 8 example dashboard 800 also includes an area 810 summarizing the total number of steps and total number of invalid steps. It will be appreciated that the information included in the example dashboard 800 may be presented differently on the same or different screens, e.g., using different individual visualizations, different arrangements of the screens shown, etc. In addition to being able to customize the dashboard layout (e.g., by moving screens, closing select ones of the screens, etc.), the user may select different charts of choice for different metrics. For example, pie, bar, doughnut, and/or other charts may be used for visualizing different data.

Other functionality may be built into the dashboard in certain example embodiments. For instance, in certain example embodiments, the dashboard may be used for static code analysis of a flow service, particularly at design time. This may be accomplished by having a predefined set of rules and/or an option to develop customized rules (e.g., from scratch and/or from editing existing or suggested rules). Certain example embodiments may search for errors using these rules and report on them. for instance, problems that are found as a result of the static code analysis can be indicated via a marker provided in the user interface, and an option for a fix may be provided to the user via the user interface. Different options for fixing a problem may be associated with the different rules. As an example, assume that a user is using a mathematical built-in service called divideInts for dividing integers. If the denominator field is set to zero, execution of the service will result in exception because an integer cannot be divided by zero. The static code analysis for the service can indicate that the code should be wrapped inside a Try-Catch block, e.g., so that the exception can be handled in the catch block. The problem may be detected by determining a match with a divide-by-zero rule, and the Try-Catch solution may be suggested as a result of a solution associated with the divide-by-zero rule. The health score of the flow service may be impacted by the result of the static code analysis in certain example embodiments. For instance, if the static code analysis reveals problems, the health score may be decreased. In certain example embodiments, the results of the checkers and static code analysis may be weighted differently for the overall heath score. For instance, the results of the checkers may be weighted more heavily such that a good (or bad) score from the checkers will be more impactful than a bad (or good) score from the static code analysis.

As discussed above, certain example embodiments may detect and automatically correct reference inconsistencies. Whenever a flow is exported from a first project and imported to a second project different from the first, direct and transitive references may need to be modified relative to the second project to which it is being imported. Similarly, when flow assets are promoted to another environment (e.g., from a development environment to a staging environment, etc.), references may need to be aligned for the new environment. For example, users typically will be concerned with three different environments. First, a user will create a flow services in a development environment. Once a development team completes validation, the service will be promoted to next environment, e.g., a quality assurance (QA) or staging environment. And beyond the QA environment is the environment for the actual deployment. Flow services typically will have a great many direct and indirect references, and these references typically will include a tenantID (a unique identifier for each tenant) and a projectID (a unique identifier for each project). When the assets are promoted from one environment to another, the IDs in the respective environments have to be aligned correspondingly. When the references are not properly aligned, the flow services become invalid. Inconsistent reference issues may result from multiple factors such as, for example, differences in the user environment, network issues, user errors, etc. For example, during the promotion of assets from one environment to another, references may be corrupted if there are issues related to the new infrastructure (e.g., the new infrastructure not working properly, not supporting functionality of the old infrastructure, etc.); errors tend to result from users copying-and-pasting steps from other projects and/or environments (e.g., without updating related aspects); etc. As a consequence, a user either may not be able to execute the respective flow service or the flow service may not yield the expected results during execution. When there are inconsistent or otherwise invalid references in a flow service, it can be difficult to identify the source of such problems, and the presence of transitive references can complicate the detection. However, the techniques of certain example embodiments help address these issues, e.g., using the approaches set forth in detail below.

In this regard, the Flow Health Checker of certain example embodiments scans the flow service "nodes" (e.g., representations of the flow services and other assets as represented in a structured file format such as, for example, JSON, XML, or the like) and checks whether there are any invalid references in any of its nodes/map copy/map set/map delete. If any one of the nodes is found invalid, an inference is made that the flow is unhealthy, and the node may be flagged for potential follow-up corrective action.

Figure 9:
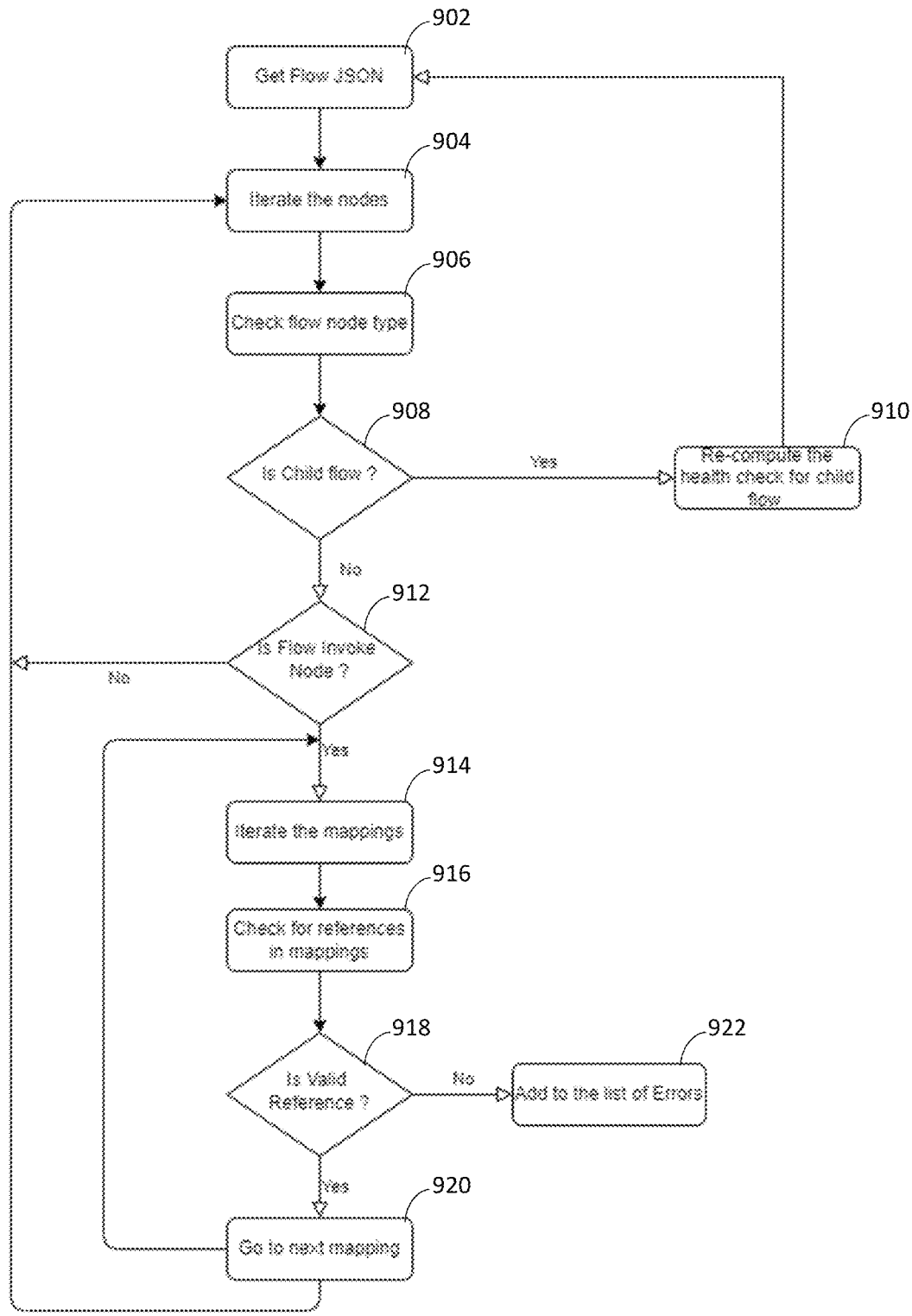
FIG. 9 is a flowchart showing an example approach for deducing errors in a flow service, in accordance with certain example embodiments.

FIG. 9 is a flowchart showing an example approach for deducing errors in a flow service, in accordance with certain example embodiments. As shown in FIG. 9, in step 902, the algorithm obtains and accesses the flow JSON or other structured or non-structured representation of the respective flow service. It begins to iterate on the nodes in step 904. The respective node type is checked in step 906. In step 908, a determination is made as to whether the node is representative of a child flow. If so, then the health check is recomputed for the child flow in step 910, and the process cycles back to step 902.

If the node is not representative of a child flow as determined in step 908, then in step 912, a determination is made as to whether the node type is a "FLOW_INVOKE" type node. In the FlowService language, FLOW_INVOKE refers to a node that is referring to a connector (e.g., application) or built-in service or another FlowService. If not, then the process cycles back to step 904 to continue iterating on the nodes.

However, if a determination is made in step 912 that the node type is a "FLOW_INVOKE" type node, then the process scans the mapping inside of the node and begins to iterate on the mappings in that node in step 914. In step 916, one or more checks is/are performed for any references identified in the namespace. For example, checks may be performed to determine whether a called service is present in the namespace. References inside the sub-nodes also may be checked including, for example, for MAP_COPY, MAP_SET, and MAP_DELETE.

Based on these operations, in step 918, a determination is made as to whether the reference is valid. If so, the process in step 920 continues to the next mapping, looping back to step 914 to continue iterating on the mappings. It will be appreciated from FIG. 9 that the process is repeated for all of the mappings in a node. If a mapping is found to have an invalid reference as determined in step 918, metadata and/or other information about the error is stored in a data structure in step 922. For example, an error list is maintained identifying the implicated flow service and/or asset, the step where the error was found, what type of error was present, etc. The data structure may be read by the checker and used to generate information for the dashboard and/or a sub-screen thereof.

It will be appreciated from FIG. 9 that the same procedure is performed until all the nodes in the flow are iterated on. In that regard, whenever there is a node that refers to another flow service, the flow information (from the JSON or other file) of the child flow is fetched, and the whole exercise is repeated again (e.g., as indicated in the loop including step 910). In this way, transitive and hierarchical references of the flow can be checked.

As indicated above, a number of different approaches may be taken to determine whether a node has a reference-related error. For example, pattern analysis may be leveraged in certain example embodiments. In this regard, from the mapping/node information, the algorithm tokenizes the reference paths. The algorithm checks whether the tenant information is proper using pattern matching. The pattern matching in certain example embodiments is performed on the fully qualified name of the reference assets used in the service. The name exists in a namespace following a naming convention; thus, certain example embodiments perform pattern matching using a regular expression or the like. The pattern matching check may consider the project identifier and/or the tenant identifier in certain example embodiments. Aspects of the name and namespace may be known in advance based on domain expertise and/or knowledge of the technology, thereby facilitating definition of the regular expression. In case there is no match, a determination is made that the reference is prone to being erroneous. Similarly, a pattern-matching check may be performed to analyze whether the project reference is proper in the path. In case there is no match, an inference may be made that the project reference is likely to be error-prone. Once an error is detected, details such as, for example, the following may be stored in a data structure for access by the checker and subsequent display via the dashboard and/or dashboard sub-screen(s): node type, metadata of the node (e.g., name, creator, creation time/date, user who last modified the counterpart asset, date/time of the last modification, etc.), the pattern where the error was captured, the step number, etc.

Figure 10:
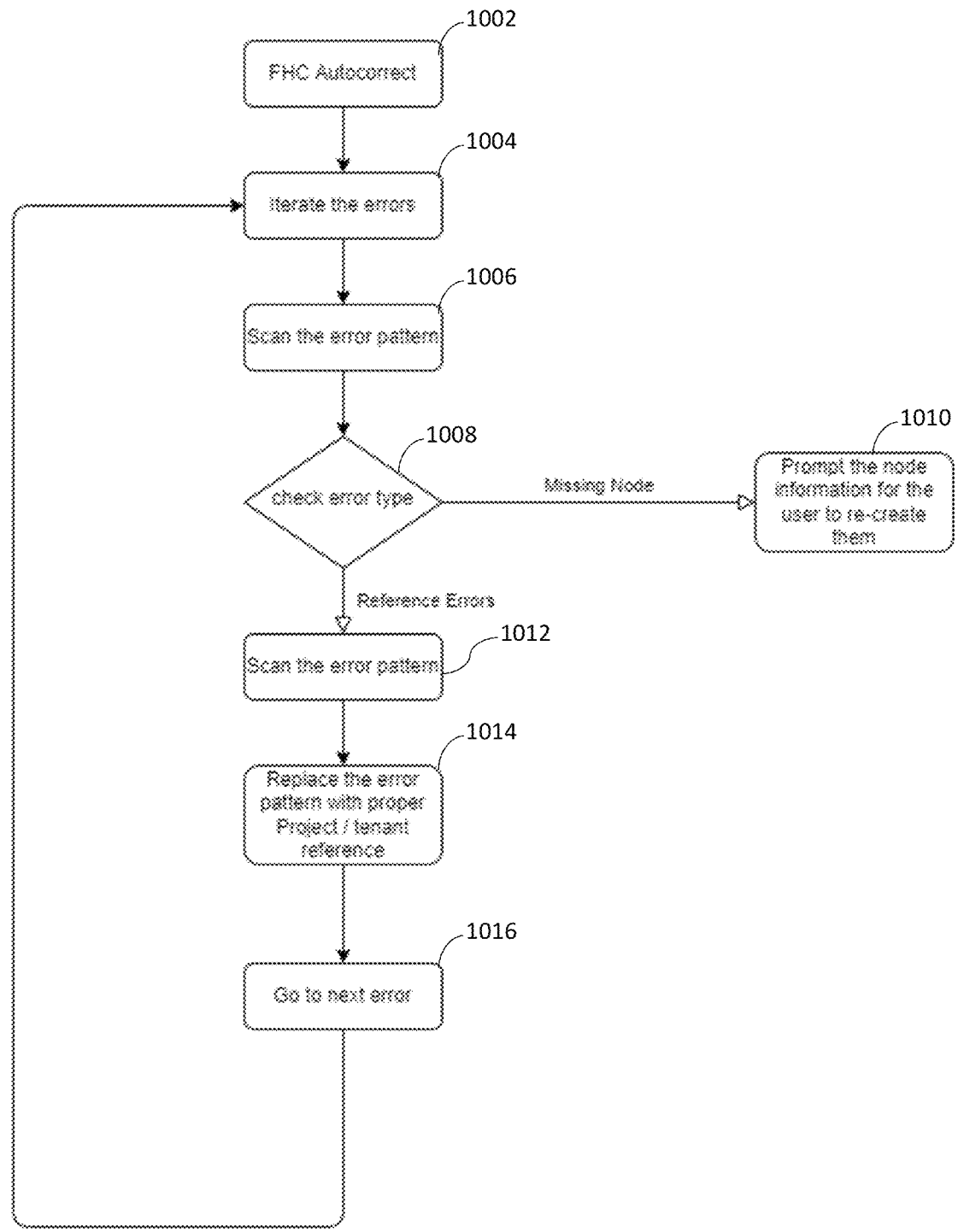
FIG. 10 is a flowchart showing an example approach for correcting a reference error in an automated manner, in accordance with certain example embodiments.

As indicated above, an auto-correct feature may be applied to address reference errors in certain example embodiments. FIG. 10 is a flowchart showing an example approach for correcting a reference error in an automated manner, in accordance with certain example embodiments. The flow health checker auto-correction procedure is initiated in step 1002. The flow hierarchy is checked as detailed above, and the auto-correction procedure iterates through the errors found as indicated in step 1004. The latter includes retrieving the list of errors, and details related thereto. These details include the node identifiers, types of errors, steps where the errors are located, etc.

Each error is considered, and the error type is checked in step 1008. There are multiple possible different error types including, for example, reference-related errors, missing nodes in the namespace, account-related errors, configuration-related errors, and asset-related errors. If there is a missing node error (which itself is one type of asset-related error), for example, then in step 1010 the user is prompted for node information so that the missing node can be re-created or otherwise linked to. Because the node is determined to be missing, certain example embodiments simply re-create them as a straightforward resolution approach.

Other auto-correct functionality of certain example embodiments is designed to address reference-related errors. This may include, for example, problems related to project and/or tenant identifier references. Regardless, the error type can be checked in step 1012. Based on the error pattern in the error node and its type, for example, pattern-matching logic can be applied in step 1014, e.g., to insert the right project id and tenant id for the reference errors or take other action. As implied by step 1016, the procedure is repeated for all the error nodes until all of the flow services in the hierarchy are traversed.

Figure 11:
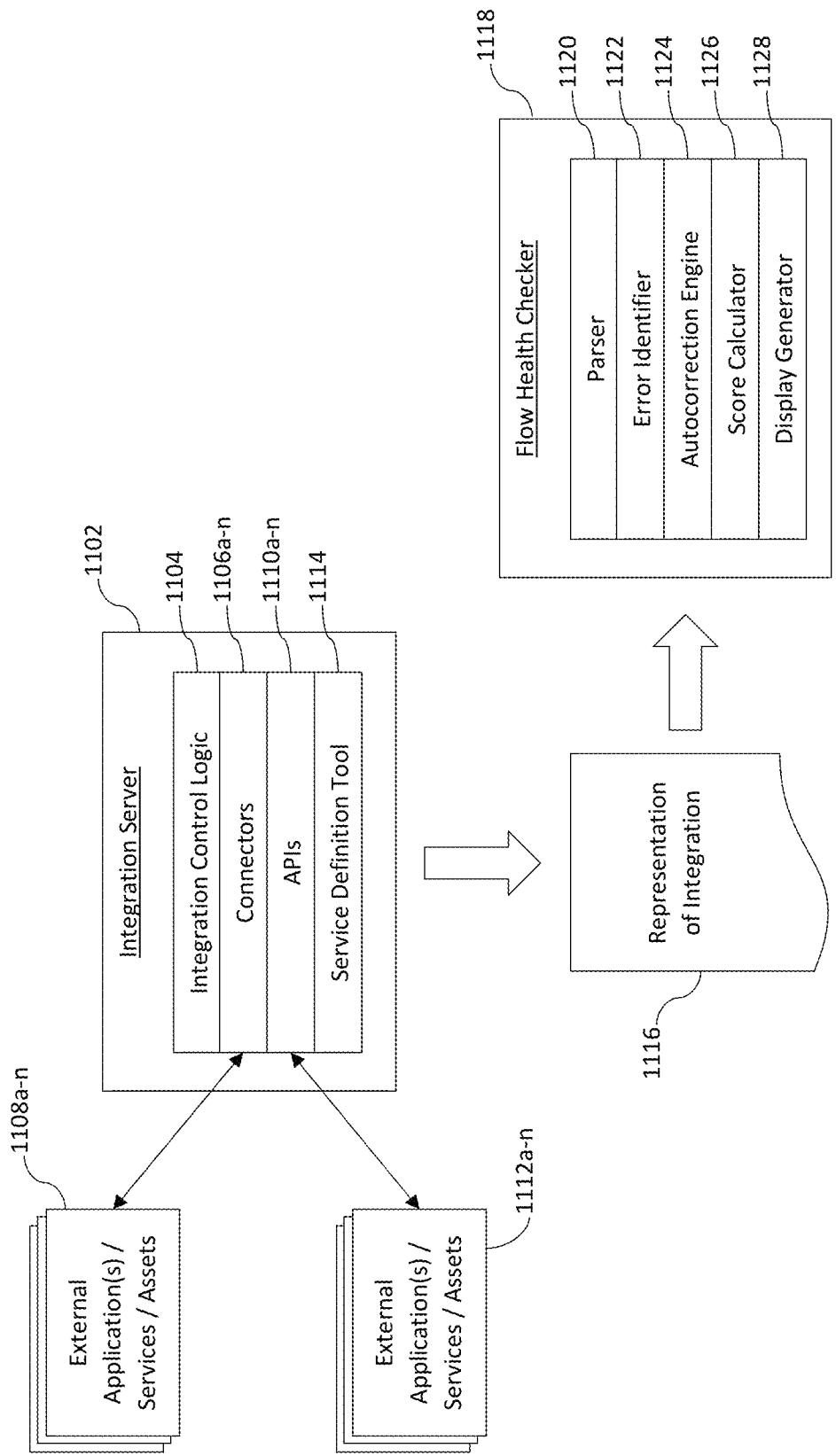
FIG. 11 is a block diagram showing computing components that may be used in accordance with certain example embodiments.

FIG. 11 is a block diagram showing computing components that may be used in accordance with certain example embodiments. FIG. 11 shows an integration server 1102, which includes integration control logic 1104. The integration control logic 1104 operates under control of processing resources including at least one processor and a memory and is configured to facilitate an integration in connection with one or more connectors 1106a-n that interface with one or more external applications, services, assets, or the like 1108*a*-1108*n* and in connection with one or more APIs 1110*a*-1110*n* that interface with one or more external applications, services, assets, or the like 1112*a*-1112*n*. The external applications, services, assets, or the like 1108*a*-*n*, 1112*a*-1112*n* may be cloud-based bundles of executable program logic, storage systems, platforms, or the like. Each of these elements may be supported by appropriate hardware including the same, shared, or different processing resources. The integration is defined using a service definition tool 1114, which is configured to export a representation of the integration 1116 in any suitable format such as, for example, a structured file format like XML or JSON. The flow health checker 1118 includes a plurality of different executable modules. These modules may be configured as software modules executable by or as a part of the service definition tool 1114 in certain example embodiments. In certain example embodiments, the flow health checker 1118 is implemented as a part of the service definition tool 1114 and thus is operable under the control of the processing resources of the integration server 1102. The flow health checker 1118 includes a parser 1120, which is configured to read the representation of the integration 1116, identifying nodes in the representation 1116 as well as attributes of those nodes. An error identification module 1122 identifies reference-, asset-, and configuration-related errors, e.g., by performing functionality described above, for example, in connection with FIG. 9. This may include performing pattern matching via execution of one or more predefined regular expressions or the like. An autocorrection engine 1124 operates on output from the error identification module 1122 and automatically and programmatically corrects errors of different defined types, e.g., by performing functionality described above, for example, in connection with FIG. 10. That is, the operations described above in connection with FIG. 10 can be performed automatically and programmatically by the flow health checker 1118 in certain example embodiments. In certain example embodiments, the correction is programmatic in the sense that it is performed by the flow health checker 1118 without user intervention and in accordance with predefined rules, heuristics, and/or other types of pre-programmed actions. Pre-programmed corrective actions in some instances may require or request user confirmation. Errors that cannot be automatically and programmatically corrected can be flagged for user follow-up, e.g., using a user interface or other element of the flow heath checker. The score calculator 1126 calculates a health score for a given service or grouping of services (e.g., all services within a given flow hierarchy). The score may be calculated in advance or dynamically, e.g., upon a user selecting a given flow or group of flows. The display generation module 1128 helps display output from these and/or other modules including, for example, a hierarchical view of the integration together with health scores, indications where errors have been found and/or corrected, indications where errors have been found and need to be corrected, etc. In certain example embodiments, a static code analysis module may be provided as a part of the flow health checker 1118.

The following is example code that shows model interfaces for a flow health checker in accordance with certain example embodiments. It will be appreciated that different interfaces and implementations may be provided in different example embodiments, and the following is provided by way of example and without limitation, unless explicitly claimed.

```
export interface IFlowSummaryTree{
   listOfFlowSummaries:Map<string,IFlowSummary>;
}
export interface IFlowSummary{
   flowDetails:IFlowDetails;
   flowComposition:IFlowComposition;
   flowStats:IFlowStatistics;
   flowValidity:boolean;
}
export interface IFlowDetails{
   flowname:string;
   projectname:string;
   createdby:string;
   modifiedby:string;
   version:string;
   creationDate:string;
   modifiedDate:string;
}
export interface IFlowComposition{
   listOfCompositionItems: Map<IStepCategory,IFlowCompositionItem>;
}
export interface IFlowCompositionItem{
    type: IStepCategory;
    totalNumber: number;
    invalidNumber: number;
    validity: boolean;
}
export interface IFlowStatistics{
listOfFlowErrors:Array<IStepError>;
totalSteps:number;
invalidSteps:number;
}
export interface IStepError{
   invalidToken:string;
   stepNumber:number;
   category:IStepCategory;
   errorType:Array<IErrorType>;
   stepNodeType:IStepNodeType;
   node?:string;
   flowSummary?:IFlowSummary;
   hasDocumentReference:boolean;
}
export enum IErrorType{
   PROJECT_ID_ERROR,
   TENANT_ID_ERROR,
   CHILD_FLOW_ERROR,
}
export enum IStepCategory{
   CONNECTOR,
   CONTROL,
   FLOW_SERVICE,
   SERVICE,
}
export enum IStepNodeType{
   MAPCOPY,
   MAPSET,
   MAPDELETE,
   TRANSFORMER,
}
```

It will be appreciated that the techniques disclosed herein provide a tool useful for integration specialists and/or others in the iPaaS technical domain who develop flow services and promote them. The techniques disclosed herein also are advantageous for the quality assurance (QA) community that tests flows, as the techniques of certain example embodiments can be leveraged to help detect and correct reference issues, e.g., at design time. This can be very helpful when rectifying the design time issues that may occur during the import, publishing, and/or deployment of the respective flow services.

It will be appreciated that as used herein, the terms system, subsystem, service, engine, module, programmed logic circuitry, and the like may be implemented as any suitable combination of software, hardware, firmware, and/ or the like. It also will be appreciated that the storage locations, stores, and repositories discussed herein may be any suitable combination of disk drive devices, memory locations, solid state drives, CD-ROMs, DVDs, tape backups, storage area network (SAN) systems, and/or any other appropriate tangible non-transitory computer readable storage medium. Cloud and/or distributed storage (e.g., using file sharing means), for instance, also may be used in certain example embodiments. It also will be appreciated that the techniques described herein may be accomplished by having at least one processor execute instructions that may be tangibly stored on a non-transitory computer readable storage medium.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of detecting and correcting errors in services defining an integration of disparate computing components in an integration platform-as-a-service environment, the method comprising: iterating through the services to identify reference mappings therein; for each respective identified reference mapping in each of the services, determining whether a reference corresponding to the respective identified reference mapping is valid; and for each respective reference determined to be not valid: determining an error type associated with the respective reference, wherein the determined error type is one of multiple possible different error types, and automatically and programmatically replacing an aspect of the reference; prompting a user to create an element of the integration, provided that the error type determined for the respective reference is of a second type different from a first type, the first type corresponding to a reference-related error, the second type corresponding to a missing element of the integration and being an asset-related error; and detecting configuration-related errors in addition to asset-related errors and reference related errors.

2. The method of claim 1, further comprising:
based on determination that the error type determined for the respective reference is of a second type of the multiple possible different error types, prompting a user to create an element of the integration.

3. The method of claim 2, wherein the first type corresponds to a reference error and the second type corresponds to a missing element of the integration.

4. The method of claim 1, wherein the aspect of the respective reference that is automatically and programmatically replaced is a project and/or tenant related reference.

5. The method of claim 1, wherein the aspect of the respective reference that is automatically and programmatically replaced is based on pattern matching the aspect of the respective reference with corresponding aspects in other services in the integration.

6. The method of claim 1, wherein the determination as to whether a reference is valid is performed by pattern matching an aspect of the respective reference with a representation of a fully qualified name in a namespace following a naming convention.

7. The method of claim 6, wherein the pattern matching is performed using a regular expression.

8. The method of claim 1, wherein the services are represented as nodes in a structured file format, the method further comprising retrieving the nodes from the structured file format for the iterating.

9. The method of claim 1, further comprising calculating and generating for display a health score for a given service based on a number of configuration, asset, and reference related errors detected.

10. The method of claim 9, wherein the services are arranged hierarchically, and wherein the health score is for the given service and any descendant services thereof.

11. The method of claim 9, further comprising performing static code analysis on one of more of the services, wherein the health score is further based on the static code analysis.

12. The method of claim 1, wherein the services are arranged hierarchically, and further comprising generating for display a representation of the service hierarchy in which different kinds of detected errors are highlighted in different ways.

13. A non-transitory computer readable storage medium storing instructions that, when performed by a processor of a system, detect and correct errors in services defining an integration of disparate computing components in an integration platform-as-a-service environment by performing operations comprising:
iterating through the services to identify reference mappings therein;
for each respective identified reference mapping in each of the services, determining whether a reference corresponding to the respective identified reference mapping is valid;
for each respective reference determined to be not valid:
determining an error type associated with the respective reference, wherein the determined error type is one of multiple possible different error types; and
based upon determination that the error type determined for the respective reference is of a first type is one of multiple possible different error types, automatically and programmatically replacing an aspect of the reference;
prompting a user to create an element of the integration, provided that the error type determined for the respective reference is of a second type different from the first type, the first type corresponding to a reference-related error, the second type corresponding o a missing element of the integration and being an asset-related error; and
detecting configuration-related errors in addition to asset-related errors and reference related errors.

14. A system for detecting and correcting errors in services defining an integration of disparate computing components in an integration platform-as-a-service environment, the system comprising: an interface configured to enable access to a representation of the services defining the integration; processing resources including at least one processor and a memory coupled thereto, the processing resources being configured to perform operations comprising: accessing the representation of the services via the interface; iterating through the services to identify reference mappings therein; for each respective identified reference mapping in each of the services, determining whether a reference corresponding to the respective identified reference mapping is valid; and for each respective reference determined to be not valid: determining an error type associated with the respective reference, wherein the determined error type is one of multiple possible different error types, and automatically and programmatically replacing an aspect of the reference; prompting a user to create an element of the integration, provided that the error type determined for the respective reference is of a second type different from a first type, the first type corresponding to a reference-related error, the second type corresponding to a missing element of the integration and being an asset-related error; and detecting configuration-related errors in addition to asset-related errors and reference related errors.

15. The system of claim 14, wherein the aspect of the respective reference that is automatically and programmatically replaced is a project and/or tenant related reference.

16. The system of claim 14, wherein the determination as to whether a reference is valid is performed by pattern matching an aspect of the respective reference with a representation of a fully qualified name in a namespace following a naming convention.

17. The system of claim 14, wherein the services are represented as nodes in a data structure having a structured format, the interface enabling access to the data structure for the iterating.

18. The system of claim 14, wherein the processing resources are configured to perform further operations comprising calculating and generating for display a health score for a given service based on a number of configuration-, asset-, and reference-related errors detected.

19. The system of claim 18, wherein the services are arranged hierarchically, and wherein the health score is for the given service and any descendant services thereof.

20. The system of claim 18, wherein the processing resources are configured to perform further operations comprising performing static code analysis on one of more of the services, wherein the health score is further based on the static code analysis.

21. The system of claim 18, wherein the processing resources are configured to perform further operations comprising generating for display a hierarchical representation of the services in which different kinds of detected errors are highlighted in different ways.

22. An integration server comprising the system of claim 14.

23. The integration server of claim 22, further comprising a tool for building the integration and the services used therein.

* * * * *